United States Patent [19]

Steketee

[11] 4,091,878
[45] May 30, 1978

[54] GROUND WORKING IMPLEMENT

[75] Inventor: Cornelius Jan Steketee, Driewegen, Netherlands

[73] Assignee: P. J. Zweegers end Zonen Landbouwmachinefabriek B.V., Geldrop, Netherlands

[21] Appl. No.: 654,042

[22] Filed: Jan. 30, 1976

[30] Foreign Application Priority Data

Feb. 6, 1975 Netherlands .......................... 7501408

[51] Int. Cl.² ............................................. A01B 49/02
[52] U.S. Cl. .................................... 172/147; 172/177; 172/179; 172/198; 172/520; 172/553; 172/657; 172/705
[58] Field of Search ................. 172/21, 121, 122, 142, 172/147, 160, 173, 177, 179, 180, 184, 198, 443, 448, 520, 521, 552, 553, 554, 570, 572, 573, 657, 679, 680, 705

[56] References Cited

U.S. PATENT DOCUMENTS

| | | | |
|---|---|---|---|
| 174,245 | 2/1876 | Hopkins | 172/350 X |
| 250,199 | 11/1881 | Burd | 172/177 |
| 328,561 | 10/1885 | Beal | 172/177 |
| 332,581 | 12/1885 | Barnard et al. | 172/147 |
| 678,396 | 7/1901 | Hampton | 172/121 X |
| 862,877 | 8/1907 | La Follette | 172/553 X |
| 1,234,002 | 7/1917 | Forrest | 172/552 X |
| 1,301,226 | 4/1919 | Cady | 172/554 |
| 2,704,018 | 3/1955 | Oehler et al. | 172/448 X |
| 2,741,887 | 4/1956 | Denton | 172/552 |
| 3,193,306 | 7/1965 | Pettit | 172/443 X |

Primary Examiner—Richard T. Stouffer
Attorney, Agent, or Firm—Edmond M. Jaskiewicz

[57] ABSTRACT

An agricultural implement for pulverizing the top layer of the soil. It comprises a positively coupled pair of rollers rolling over the ground at unequal surface speeds so that at least one of the rollers is constantly slipping. A harrow is mounted in front of each roller. The assembly of rollers and harrows is pressed onto the ground by a rod comprising a built-in compression spring, which may be adjustable. Each roller is composed of a set of longitudinal strips mounted on an axle.

11 Claims, 4 Drawing Figures

GROUND WORKING IMPLEMENT

This invention relates to a ground working implement, comprising at least two successive, ground contacting, profiled rollers whose longitudinal extension is transverse to the direction of movement of the implement.

It is an object of the invention to improve such a ground working implement so as to obtain a very fine pulverising of the top layer of the soil.

This object is attained according to the invention in that two successive rollers are coupled by a chain drive or other rotary movement transmitting device, such that they have a mutually different surface speed when set into rotation by ground contact. Preferably, a harrow is mounted between the two said rollers and/or in front of or behind them.

The invention is now elucidated with reference to the accompanying drawing.

Figure 1:
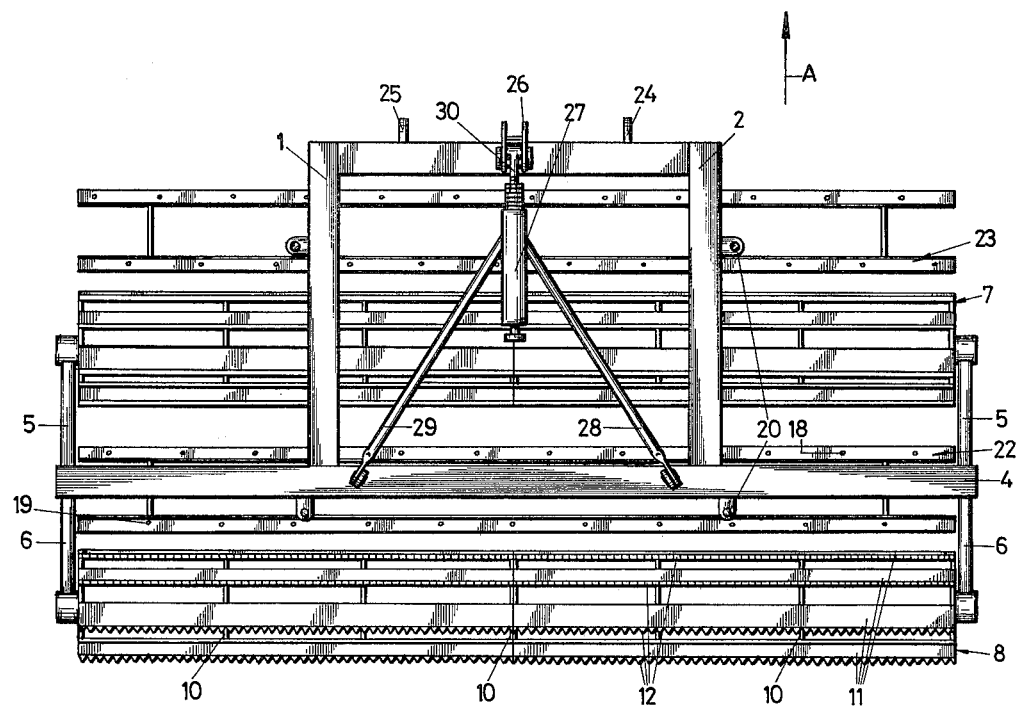
FIG. 1 is a top view of an embodiment of a ground working implement according to the invention.
Figure 2:
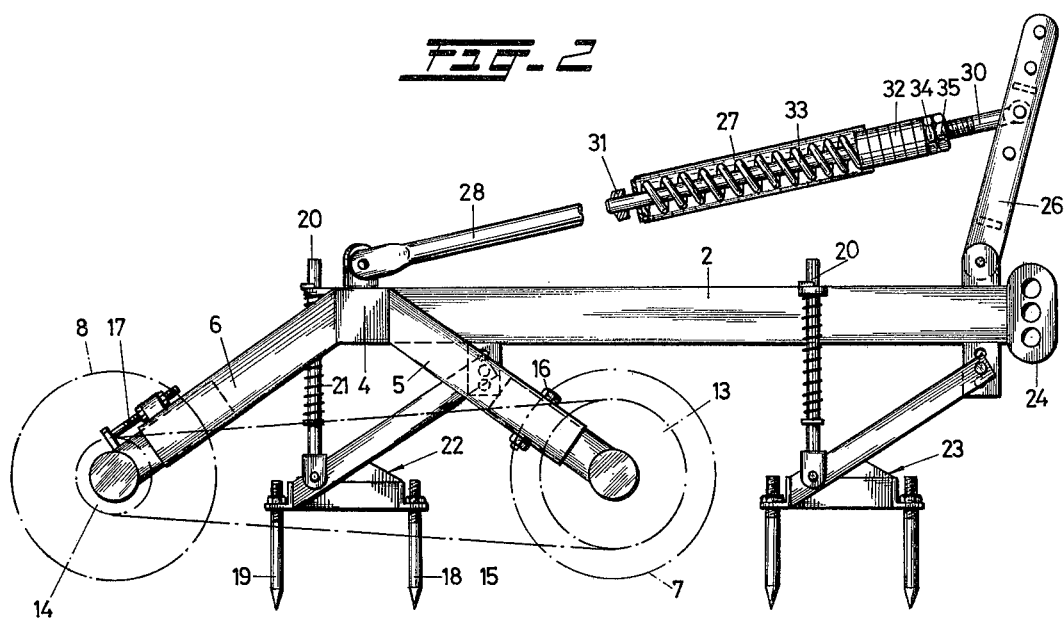
FIG. 2 is a side view of the implement according to FIG. 1.
Figure 3:
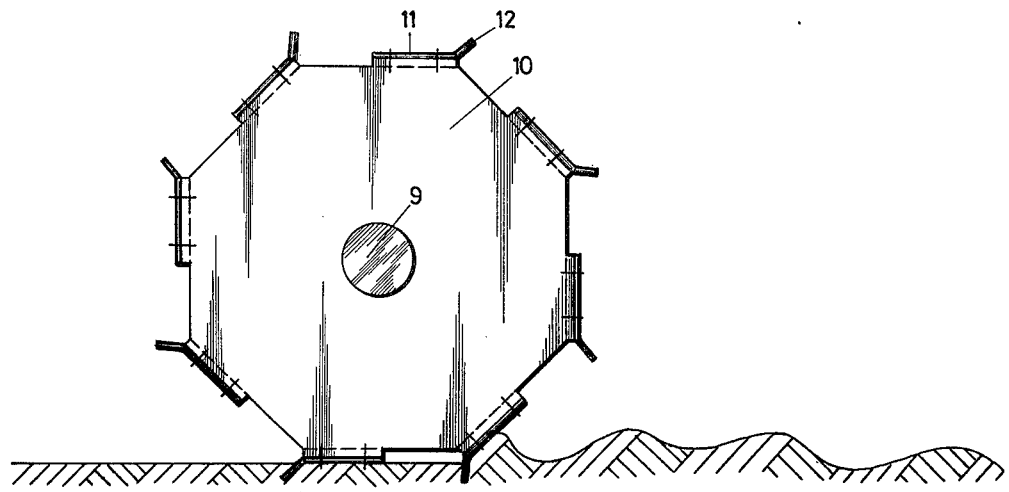
FIG. 3 is a side view of a roller of the implement according to FIG. 1.

In the embodiment according to FIGS. 1 to 3, the frame of the implement comprises two side members 1 and 2, the front ends of which are connected by a short cross member 3 and the rear ends of which are connected by a long cross member 4 which may have a length of e.g. 3 m. All indications such as "front" and "rear" relate to the direction of movement of the implement which is shown by an arrow A in FIG. 1.

Each end of the rear cross member 4 carries two downwardly tilted arms, namely a downwardly and forwardly tilted arm 5 and a downwardly and rearwardly tilted arm 6. A front roller 7 is rotatably journalled between the two front arms 5 and a rear roller 8 is rotatably journalled between the two rear arms 6. Each roller comprises a shaft 9 carrying a plurality of regularly distributed octagonal, radial plates 10, and axial strips 11 are fixed over the full length of the roller to the front corners of the ribs of the octagonal plates, viewed in the direction of rotation of the roller. The main part of each strip 11 is parallel to the underlying rib of the plate 10, and the front portion 12 of each strip 11 is bent outwards at an angle of about 45°. The front edge 12 of each strip 11 of the front roller 7 is entirely smooth, whereas the front portion 12 of each strip 11 of the rear roller 8 has a toothed edge.

At both sides of the implement, the two rollers 7 and 8 are coupled by a chain drive or the like, the larger sprocket 13 of which is mounted on the front roller 7 and the smaller sprocket 14 of which is mounted on the rear roller 8, whereas a chain 15 surrounds both sprockets in the usual way. The diameter of the front sprocket 13 is at least about twice the size of the diameter of the rear sprocket 14, so that during operation, the front roller 7 rotates at a higher surface speed than the rear roller 8.

The rollers 7, 8 are set into rotation by ground contact and by the load of the weight of the implement, to which may be added the load of a compression spring yet to be described. The lengths of the two supporting arms 5 and 6 of the rollers 7 and 8 may be independently adjusted since these arms have a telescopical construction, the selected adjustment of the front arms 5 being fixed by a through bolt 16, and the selected adjustment of the length of the rear arms 6 being fixed by a settable adjustment rod 17.

The rear side of the rear cross member 4 is provided with lugs from which is suspended, by means of a supporting rod 20 and a spring 21, a harrow 22 comprising two rows of prongs 18 and 19. The prongs of the front row 18 may be staggered in known manner with respect to the prongs of the rear row 19. The spring 21 pushes the harrow 18, 19 downwards with respect to the frame 1, 2, 3, 4. The harrow is further suported by arms directly obliquely forwards and upwards and being pivotally connected to the frame members 1 and 2.

A further harrow 23 extends near the front cross member of the frame, parallel to and spaced from the front roller 7. The construction of this harrow corresponds to the construction of the harrow disposed between the rollers 7 and 8, so that the construction of the harrow 23 need not be described in detail.

The front cross member 3 of the frame carries two lugs 24, 25 for connection to the lower or lifting links of the three point lifting device of a tractor. An upwardly directed arm 26 is pivotally mounted on top of the front cross member 3 of the frame, and the upper end of this arm 26 can be connected to the top link of the three point lifting device of the tractor. A load applying link is pivotally mounted between the upwardly directed arm 26 and the rear cross member 4 of the frame. This load applying link comprises a tube 27 which is pivotally connected to the rear cross member 4 of the frame by two rods 28 and 29 extending in V-shape obliquely rearwardly and downwardly, and the load aplying link further comprises a forward rod 30, and the front end of which is pivotally connected to the upwardly directed arm 26 and which rod 30 traverses the tube 27 and ends behind the tube 27 in an abutment head 31. A sliding sleeve 32 is mounted on the rod 30 so that the greater part of it extends before the forward end of the tube 27, whereas its rear end is disposed inside said tube. A strong compression spring 33 is arranged between the rear end of the sleeve 32 and the bottom of the tube 27. Forward of the sleeve 32, a nut 34 and counter nut 35 are screwed on screw thread on the rod 30 for adjusting the depth at which the sleeve 32 is held inside the tube 27. For facilitating this adjustment of the sleeve 32 with respect to the tube 27, the sleeve 32 is provided with a plurality of regularly distributed marking rings. In the situation shown, the adjustment is such that when the implement is not coupled to a tractor, the spring 33 in the tube 27 is fully distended and there is a certain amount of free play between the head 31 of the rod 30 and the bottom of the tube 27. However, this is only one of the possibilities, the adjustment could also be such that there is a pre-tensioning of the spring.

The operation of the device is as follows:

After the implement has been fastened to the three point lifting device of a tractor, the position of the adjustment sleeve 32 on the rod 30 is set by means of the nuts 34 and 35 such that in a normal position of the top link of the three point lifting device (which, as known, is length-adjustable), the device assumes a position in which the spring 33 causes about the desired ground pressure of the rollers 7 and 8. During operation, this ground pressure can be readjusted by changing the length of the top link of the three point lifting device. The ground pressure is at a minimum in an adjustment in which the spring 33 in the tube 27 has a free amount of play, so that there is only a weight load on the rollers 7 and 8, and the ground pressure is at a maximum at maximum tension of the spring 33. Since the surface speed of the rollers 7 and 8 is always unequal, one of these rollers will always slip with respect to the ground, which causes a very good pulverisation of the top soil, in combination with the harrows mounted before the rollers. The selected load on the rollers 7 and 8 determines the slipping ratio. At minimum load, there will be practically no slippage of the roller 7 and thus, the roller 8 will rotate almost twice as fast than in the event that it would simply roll over the ground. At increasing load, the speed of the roller 8 will be relatively lower and the slippage of the roller 7 will be higher, that is to say that the roller 7 rotates slower than in the event that it would simply roll over the ground. The extent of pulverisation of the ground is determined in the first place by the combination of the harrow action of the two harrows with the selected slipping action of the two rollers, and it is determined in the second place by the chosen profile of the rollers 7 and 8.

Several variants are possible within the scope of the invention. The frame may carry three instead of two rollers and the third roller may be independent or may be coupled with the two described rollers. It is also possible to mount the set of two coupled rollers pivotable in the frame instead of fixed. If desired, a hood may be mounted over the device. Also, the rollers 7 and 8 could be constructecd without a central shaft 9.

Figure 4:
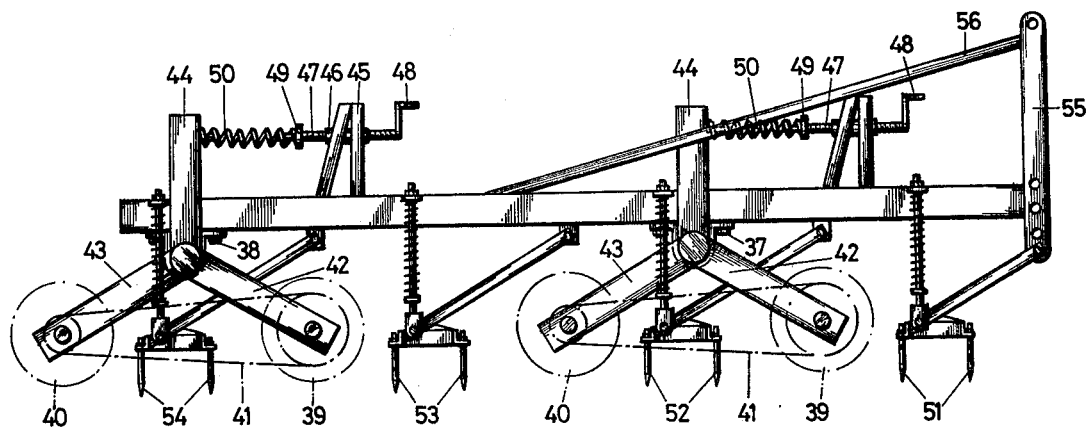
FIG. 4 is a side view of a variant.

FIG. 4 of the drawings shows a variant in which two sets of two rollers are each pivotally mounted to a common frame. Under the side members 36 of the frame, spaced bearings 37 and 38 are mounted, each of which carries one set of two rollers, such that it can pivot about a horizontal axis extending transverse to the direction of movement of the implement. Clearly, there are several bearings 37, as well as bearings 38 in line transversely of the frame.

Each set of two rollers corresponds in principle with the embodiment described with reference to FIG. 2 and thus comprises a front roller 39 and a rear roller 40 which may have equal diameters but which are coupled by a chain drive 41 so that the rear roller 40 rotates faster than the front roller 39 when the device is pulled over the ground. The two upwardly tilted supporting arms 42 and 43 are rigidly connected, but can pivot in the bearings 37 as a whole, and they are rigidly connected to an upper arm 44 which thus may pivot about the axis of the bearings 37 together with the supporting arms 42 and 43.

A bracket 45 is fixed to the top of the frame 36 in front of the arm 44 of each set of rollers, viewed in the direction of movement of the implement. In this bracket is fixed a sleeve 46 with internal screw thread through which runs a screw threaded spindle 47 which is adjustable in longitudinal direction of the device by means of a crank 48, hand wheel or the like, fixed at its front end. Behind the bracket 45, the spindle 47 is provided with a shoulder 49 supporting a compression spring 50, the other end of which rests against the upper arm 44.

It will be clear that by rotating the crank 48, the pressure of the compression spring 50 on the upper arm 44 may be adjusted between zero and maximum and that this adjustment adjusts the pressure with which the front roller 39 is pressed onto the ground. When the pressure of the spring is zero and the implement is stationary, the front roller 39 rests on the ground with its full weight, whereas, when the implement is pulled over the ground, the couple exerted by the tractor on the frame 36 and on the bearings 37 and 38 and which presses the roller 39 against the ground via the arms 42, is added to the weight load. Dependent on the drag exerted on the rollers 39 and 40, the slippage of the roller 39 over the ground may be reduced to zero, so that speed of the rollers 39 and 40 is at a maximum and the slippage of the roller 40 over the ground is also at a maximum. By increasing the pressure of the spring 50 against the upper arm 44, the pressure of the front roller 39 on the ground can be decreased, which decreases also the surface speed of the roller, in other words, the slippage of the roller 39 increases and the slippage of the roller 40 with respect to the ground decreases. In some instances, it may be desirable to set the pressure of the spring 50 of the front set of rollers at another value than the pressure of the spring 50 on the rear set of rollers. Thus, this variant can be adapted to a very large area of different conditions.

In the embodiment of FIG. 4, harrows 51, 52, 53, 54 are mounted between the two rollers of each set and in front of each set, just as in the first embodiment, and they are resiliently supported in corresponding manner and thus need not be described in detail. The connection of the top link of the lifting device of the tractor is made to an upstanding arm 55, which in this case may be rigid and may be connected with a rearward point of the frame 36 by a non-adjustable link 56, the adjustment of the frame 36 being settable by the top link of the tractor. However, it would be possible to replace the rigid link 56 by an adjustable link such as described for the first embodiment.

I claim:

1. A ground working implement comprising a rigid frame adapted to be connected to a three-point lifting device of a tractor vehicle, a pair of ground contacting rollers on said frame positioned successively in the direction of movement of the implement and each roller extending transversely to said direction, a plurality of axially extending ground contacting strips circumferentially positioned around each roller and extending the full length of each roller, means on said frame for applying an adjustable force to press said rollers into ground contact, driving means coupling said rollers for transmitting rotary motion therebetween when said rollers are rotated by movement upon the ground, means on said rollers for rotating the forward roller with respect to the direction of movement at a lower circumferential speed than the other roller and both rollers rotating in the same direction, and a harrow mounted in front of at least one of said rollers, said harrow mounted parallel to and spaced from said one roller and comprising at least one row of spring-loaded vertical prongs extending over the length of said one roller.

2. Implement according to claim 1 wherein said harrow and the set of two coupled rollers are mounted to said frame.

3. Implement according to claim 1 wherein the harrow comprises two successive rows of vertical prongs, which may be staggered and loaded by springs.

4. Implement according to claim 1 wherein said adjustment force applying means comprise a rod carrying a compression spring with an adjustable abutment, said rod being provided between a part of the frame near the rollers and an upwardly directed arm pivotally connected to the frame and adapted to be connected to the top link of the three-point lifting device of a tractor.

5. Implement according to claim 1 wherein at least one set of two coupled rollers is pivotally mounted to a frame.

6. Implement according to claim 5 wherein the pivotally connected set of two coupled rollers has an upper arm, an adjustment means acting upon said upper arm to vary the pressure of the front roller onto the ground.

7. Implement according to claim 6 wherein the upper arm is subjected to a helical spring, the other end of which rests against an adjustable abutment.

8. Implement according to claim 7 wherein the adjustable abutment is formed by a shoulder of a screw threaded spindle cooperating with, and adjustable with respect to, a fixed part of the frame.

9. Implement according to claim 1 wherein each of the strips on the forward roller is smooth and has a front part of which as viewed in the direction of rotation, is bent outwards at about 45°.

10. Implement according to claim 1 wherein each of the strips on the rear roller has a front part of which as viewed in the direction of rotation is bent outwards at about 45° and has a toothed edge.

11. Implement according to claim 10 wherein the main portion of each strip extends substantially tangentially to the roller circumference.

* * * * *